May 19, 1953 D. MALDARI 2,638,855
DIE FOR MACARONI PRODUCT EXTRUSION
Filed Dec. 19, 1950 2 Sheets-Sheet 1

Inventor:
Donato Maldari
BY George D. Richards,
Attorney.

May 19, 1953 D. MALDARI 2,638,855
DIE FOR MACARONI PRODUCT EXTRUSION
Filed Dec. 19, 1950 2 Sheets-Sheet 2

Inventor
Donato Maldari
BY George D. Richards
Attorney

Patented May 19, 1953

2,638,855

UNITED STATES PATENT OFFICE 2,638,855

DIE FOR MACARONI PRODUCT EXTRUSION

Donato Maldari, Brooklyn, N. Y., assignor to The De Martini Macaroni Co., Inc., Brooklyn, N. Y., a corporation of New York Application December 19, 1950, Serial No. 201,654

6 Claims. (Cl. 107—14)

This invention relates to a novel die structure for macaroni product extrusion.

The invention has for an object to provide a die for macaroni product extrusion having extrusion apertures of such novel conformation and make-up that dough expressed therethrough issues therefrom in strips in such manner that said strips are caused, as they emerge from the apertures, to be helically twisted, while at the same time extrusion of dough at the longitudinal marginal portions of the strips exceeds in quantity and speed of extrusion that which issues from the mid-portions of the apertures, whereby said marginal portions of the helically twisted strips assume a wavy or curly formation, and thus produce a finished macaroni product of unique design and appearance.

The invention has for a further object to provide, in a die for macaroni product extrusion, a novel dough extrusion aperture in the form of a transverse reversely curved slot, the respective ends of which open through sides of enlarged pockets; the upwardly open ends of said pockets being directed toward the dough supplying chamber of a press by which the die is served; all whereby dough is expressed from the pockets laterally or endwise into the end portions of the slot, and thus in quantity and speed in excess of the quantity and speed of issue of dough from the mid-portion of the slot, so that a lateral thrust is exercised upon the extruded dough which imparts a helical twist to the issuing strip of dough, as well as to cause, by excess dough extrusion at said end portions of the slot, a wavy or curly formation in and with respect to the longitudinal marginal portions of the helically twisted strip.

An illustrative embodiment of the invention is shown in the accompanying drawings, in which.

Similar characters of reference are employed in the hereinabove described views, to indicate corresponding parts.

Figure 1:
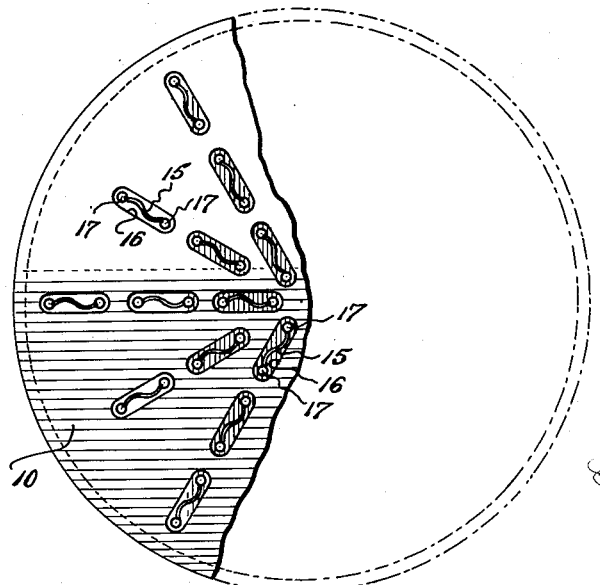
Fig. 1 is a top or internal face view of a macaroni extrusion die according to this invention.
Figure 2:
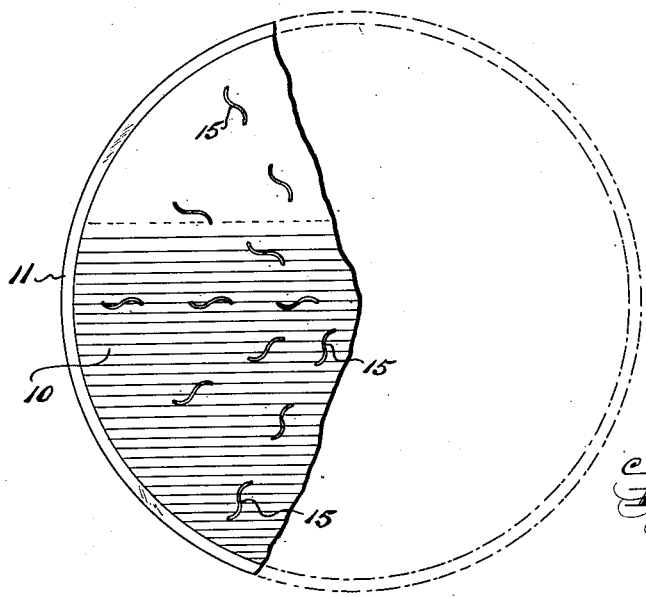
Fig. 2 is a bottom or external face view of the same.
Figures 3, 4:
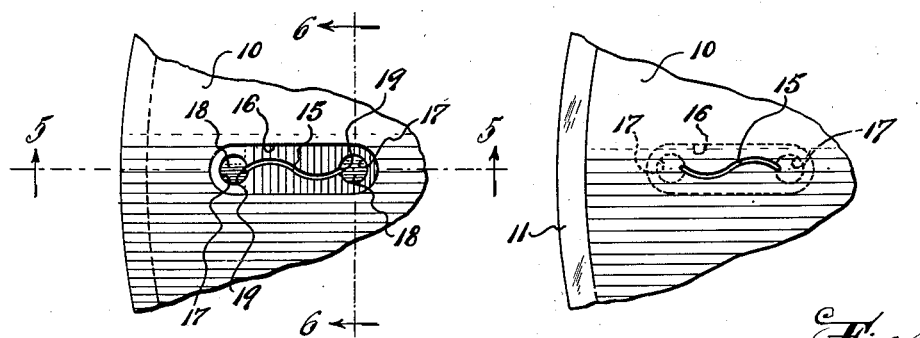
Fig. 3 is an enlarged fragmentary top plan view showing the dough receiving end of the novel extrusion aperture according to this invention.
Fig. 4 is an enlarged fragmentary bottom plan view showing the dough discharge end of said aperture.
Figure 5:
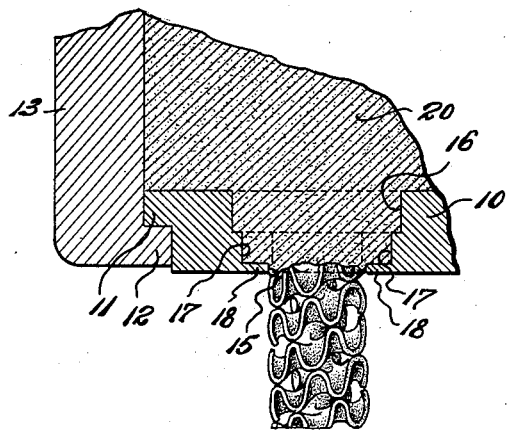
Fig. 5 is a longitudinal vertical sectional view, taken on line 5—5 in Fig. 3, but including a portion of the dough supply chamber of a press in connection with which the die of this invention is operatively mounted, this view also showing the form of the macaroni product produced by extrusion of dough through the novel extrusion aperture according to this invention.
Figure 6:
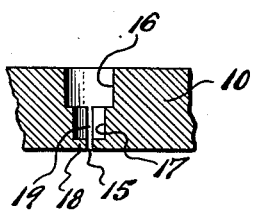
Fig. 6 is a transverse vertical sectional view, taken on line 6—6 in Fig. 3.

Referring to the drawings, the reference character 10 indicates the plate-like body of an extrusion die, which body is usually made of a bronze alloy, although it can be made of stainless steel, copper or other suitable metal or metallic alloy. The body 10 may be made of any suitable peripheral shape for correspondence to the form of dough supply chamber of the particular kind of press with which the die is to serve. For example, if the press to be equipped is of the cylinder type, the body 10 is of corresponding circular peripheral shape, and is usually provided with a projecting annular supporting flange 11 contiguous to its top or internal face; said flange being adapted to seat upon a supporting ledge 12 with which the press cylinder 13 is provided (see Fig. 5), whereby to support the die body across the bottom opening of said cylinder. The plate-like body 10 of the die is of sufficient thickness to withstand the pressure of dough to be extruded through extrusion apertures with which said body is provided. The plate-like body 10 is generally provided with a multiplicity of extrusion apertures which are arranged in any desired or suitable symmetrically grouped relation throughout the area of the body.

In the die according to this invention, each dough extrusion aperture thereof is characterized as follows:

Extending through the body 10, perpendicular to the horizontal plane thereof, is a slot-like aperture 15 which is of transverse reversely curved form from end to end. The bends or arcs of the reverse curves of said aperture 15 are comparatively shallow, i. e. substantially less than 180°, and preferably not in excess of 90°. The end to end length of the slot-like aperture 15 corresponds to the width of dough strip desired to be extruded, and the width of the aperture corresponds to the thickness of said strip. In order to reduce frictional resistance to the passage of dough when it is expressed through the slot-like aperture 15, the height of the aperture is reduced, as compared with the thickness of the plate-like body 10 of the die, by providing an upper cavity 16 which is countersunk in the top or internal face of said body. The bottom or discharge mouth of the slot-like aperture 15 lies flush with the plane of the bottom or external face of the die body 10. Formed in the body 10, respectively contiguous to the respective ends of the reversely curved slot-like aperture 15, are enlarged pockets 17 which are countersunk in the bottom of the upper cavity 16. Each pocket 17 is of less depth than the height of the aperture 15, so that the bottom end of each pocket is closed by a relatively thin bottom wall 18. Each end of the slot-like aperture 15 sufficiently intersects the side wall surface of an adjacent pocket 17 so as to provide lateral dough entranceways 19 leading from the respective pocket interiors transversely into the respective end portions of the aperture 15, said entranceways providing the sole means of communication between said pockets and said aperture.

When the press cylinder 13 is filled with dough 20 (see Fig. 5), and said dough is subjected to pressure whereby to force the same through the extrusion apertures of the die body 10, a portion of the expressed dough passes directly and perpendicularly downward through the mid-portion of a slot-like aperture 15, while other portions of the dough are forced into pockets 17 and thence, through the entranceways 19 for endwise entrance into the respective ends of the slot-like aperture 15. By reason of the reversely curved formation of the slot-like aperture 15, its end portions are disposed, in respectively opposite directions, to terminate at the side walls of the pockets 17 which are intersected thereby at an acute angle to said side wall surfaces, whereby, as a consequence of this, lateral thrusts are exerted against the longitudinal margins of the dough strip as said strip issues from the discharge mouth of the slot-like aperture 15, and these thrusts cause the issuing strip of dough to twist or turn about its longitudinal central axis (in clockwise direction as shown), thus forcing the issued strip into a generally helical formation. In addition to such twisting effect exercised upon the issuing dough strip whereby to produce the helical formation of said strip, the entranceways 19 permit of discharge of dough from the end portions of the slot-like aperture 15 in amount in excess of that which is directly discharged through the mid-portion of said aperture and at accelerated speed, with the consequence that the free longitudinal portions of the strip, due to the excess amount of dough discharge at such points, are compelled to assume a wavy, curly or ruffled formation (see Fig. 5). As a result of all this, a macaroni product is expressed from the die which is of very novel, pleasing and unique design. This novel macaroni product can be produced in suitable lengths by cutting away the formations at the bottom discharge face of the die body by means of a cutting knife (not shown) which is moved across and against the bottom face of the die body in any suitable manner already well known to the art.

Having now described my invention, I claim:
1. A die for macaroni product extrusion, comprising a die body having a single transverse and continuous reversely curved slot-like extrusion aperture perpendicular to the horizontal plane of said body, said body being further provided with upwardly open countersunk pockets, and the end portions of said extrusion aperture extending in opposite direction and terminating at the adjacent inner portions of the side walls of said respective pockets so as to intersect the side surfaces thereof at an acute angle thereto, whereby to provide lateral dough entranceways leading from the pocket interiors respectively into opposite ends of said extrusion aperture.

2. A die for macaroni product extrusion according to claim 1 wherein the respective arcs of the single reversely curved slot-like extrusion aperture are of less than 180° in extent.

3. A die for macaroni product extrusion according to claim 1, wherein the respective arcs of the single reversely curved slot-like extrusion aperture are of approximately 90° in extent.

4. A die for macaroni product extrusion, comprising a die body having an upwardly open elongated cavity countersunk in its top face portion to provide a bottom wall portion of reduced thickness contiguous to its bottom face, said bottom wall portion being further provided with a pair of upwardly open, spaced apart pockets countersunk therein respectively at the respective end portions of said cavity, and said bottom wall portion having therein a single transverse and continuous reversely curved slot-like extrusion aperture perpendicular to the horizontal plane of the body to extend between said pockets, the end portions of said extrusion aperture extending in opposite directions and respectively terminating at the adjacent inner portions of the side walls of said pockets so as to intersect the side surfaces thereof at an acute angle thereto, whereby to provide lateral dough entranceways leading from the pocket interiors respectively into opposite ends of said extrusion aperture.

5. A die for macaroni product extrusion according to claim 4, wherein the respective arcs of the single reversely curved slot-like extrusion aperture are of less than 180° in extent.

6. A die for macaroni product extrusion according to claim 4, wherein the respective arcs of the single reversely curved slot-like extrusion aperture are of approximately 90° in extent.

DONATO MALDARI.

References Cited in the file of this patent

UNITED STATES PATENTS

| Number | Name | Date |
|---|---|---|
| 2,045,421 | Tanzi | June 23, 1936 |

FOREIGN PATENTS

| Number | Country | Date |
|---|---|---|
| 286,431 | Italy | June 11, 1931 |